(12) United States Patent
Dillon

(10) Patent No.: US 6,910,845 B2
(45) Date of Patent: Jun. 28, 2005

(54) GRAIN HANDLING ASSEMBLY FOR COMBINE WITH POWERED AND STEERABLE GRAIN TRAILER

(76) Inventor: Ben N. Dillon, 206 Greensprings Dr., Columbus, OH (US) 43235

( * ) Notice: Subject to any disclaimer, the term of this patent is extended or adjusted under 35 U.S.C. 154(b) by 309 days.

(21) Appl. No.: 10/247,249

(22) Filed: Sep. 19, 2002

(65) Prior Publication Data

US 2004/0067125 A1 Apr. 8, 2004

(51) Int. Cl.[7] .................................................. B60P 1/00
(52) U.S. Cl. ....................... 414/502; 414/505; 414/526; 414/343; 414/523
(58) Field of Search ........................ 414/343, 502–505, 414/526, 523; 56/14.5, 14.6, 16.6, 122

(56) References Cited

U.S. PATENT DOCUMENTS

| | | | | |
|---|---|---|---|---|
| 4,428,182 A | * | 1/1984 | Allen et al. .................. | 56/14.6 |
| 4,590,739 A | * | 5/1986 | Abatti et al. ................. | 414/343 |
| 5,904,365 A | * | 5/1999 | Dillon ......................... | 280/419 |
| 6,606,844 B2 | * | 8/2003 | Dillon et al. ................ | 56/14.6 |

* cited by examiner

Primary Examiner—Joseph Valenza
(74) Attorney, Agent, or Firm—Mueller and Smith, LPA (57) ABSTRACT

An improved combination of a powered combine carrying a combine grain bin for housing harvested grain and a towed grain cart carrying a grain cart bin for housing harvested grain includes improved harvested grain transfer between the combine grain bin and the grain cart bin and improved off-loading of harvested grain from the combination. A generally horizontally disposed first grain movement assembly is pivotally connected within the combine grain bin and pivotally connected within the grain cart bin and disposed for reciprocally transporting grain between the combine grain bin and the grain cart bin. A generally vertically disposed second grain movement assembly is cooperatively operable with the first grain movement assembly for transferring grain from the grain cart bin to the first grain movement assembly and thence to the combine grain bin. An off-loading grain movement assembly is disposed for off-loading grain only from the combine grain bin.

22 Claims, 9 Drawing Sheets

GRAIN HANDLING ASSEMBLY FOR COMBINE WITH POWERED AND STEERABLE GRAIN TRAILER

CROSS REFERENCE TO RELATED APPLICATIONS

None

STATEMENT REGARDING FEDERALLY SPONSORED RESEARCH

Not applicable.

BACKGROUND OF THE INVENTION

The present invention generally relates to combines that pull an integrated powered and steerable grain trailer for extra storage capacity, and more particularly to a grain handling assembly therefor.

Modern grain combines, such as are used to harvest corn, wheat, soybeans, etc., and corn pickers, have significantly increased their throughput capability. These increases have resulted from improvements such as wider cutting heads and increased number of row units per machine in the case of row crops such as corn. The threshing and grain separating capacity of the machines has increased in parallel by building larger machines with higher horsepower engines.

Concomitant therewith, the number of acres in the average North American farm has increased dramatically with crop fields becoming larger and longer. Fields with a row length of one-half mile have become quite common.

The result of these simultaneous trends is that the amount of harvested crop or dean grain produced in one round or two lengths of the field has increased dramatically. The harvested grain must be carried along by the harvesting system until the end of the field is reached where it is transferred into a bulk transportation vehicle such as a truck (tractor-trailer or semi) or wagon. Combines have an onboard grain hopper In which to store the harvested grain until the end of the field has been reached. Seed corn pickers typically pull a trailer or wagon, or a truck is driven along side them to receive the grain.

Due to increased combine throughput and long fields, virtually no combine commercially available today has sufficient capacity in its on-board hopper to store the corn harvested during one round of an 80 acre field or a field which is one-half mile in length with the crop yields typically found in the U.S. corn belt. The on-board primary storage hoppers are limited in capacity by the physical size of the machine and the total weight of the combine with a full hopper, which can be carried on 2 axles or 2 tracks in some cases.

Farmers and farm equipment manufacturers have addressed this problem by developing Intermediate transport grain carts or trailers, which are pulled by a separate tractor and operator. The grain cart/tractor combination is stationed at the opposite end of the field from the road transport (bulk storage) vehicle or along the length of the field to receive the grain from the combine when its primary hopper is full and before the combine reaches the end of the field where the road transport vehicle is located. The traditional grain cart has self-unloading capability usually in the form of an auger, conveyor, or side hydraulic dump mechanism, which receives power from the tractor. The grain cart/tractor combination typically carries the grain to the end of the field and loads it into the road transport vehicle, such as a semi-truck. Examples of such grain wagons can be found in U.S. Pat. Nos. 5,013,208, 5,340,265, and 5,409,344.

Grain cart capacities typically vary from 400 bushels to 1000 bushels. Therefore, a loaded grain cart and pulling tractor may weigh as much as 90,000 pounds. Repeated trips across the field by this large vehicle combination can produce additional soil compaction, particularly in wet conditions, which reduces future crop yields. This method of intermediate storage and movement of grain with the field incrementally adds one operator and significant capital cost to the harvesting process.

In the field of trailers or wagons that are towed by a farm tractor or over-the-road tractor-trailers (so-called "semis"), U.S. Pat. No. 2,667,028 shows a towable combine with an attached grain cart. U.S. Pat. No. 4,460,193 shows a pull type swather assembly, which can be crabbed. U.S. Pat. No. 4,359,854 shows a tractor drawn combine which also can be crabbed. U.S. Pat. No. 5,412,929 shows the ability to steer a pair of rakes being towed by a tractor. U.S. Pat. No. 5,579,228 shows a servo steering control system for a non-powered trailer that Includes forward and backward motion. U.S. Pat. No. 5,209,320 shows an articulated crop pesticide sprayer adapted to be pulled. U.S. Pat. No. 4,740,006 proposes to retrofit existing tractor-trailers with a remote-control steering system. Finally, U.S. Pat. No. 5,329,451 proposes a steerable trailer and steering apparatus, which includes a servo control.

A significant advance in grain carts is disclosed in U.S. Pat. No. 5,904,365. Disclosed is a powered towing vehicle having steering wheels and a wheeled trailer is connected to the vehicle for its towing. The wheels of the trailer are connected to a source of power for generating forward and rearward movement of the trailer. These wheels also are connected to a source of power for turning such wheels in order to steer the trailer. These wheels further are connected to a sensor to sense the position of the trailer wheels as they are being steered. The steering wheels of the towing vehicle also are connected to a sensor to sense the position of the vehicle wheels as they are being steered. The trailer steering wheel sensor is displayed to an operator of the vehicle so that the vehicle operator knows the relative position of each of the steering wheels. The trailer steering power source is connected to the vehicle so that an operator of the vehicle can remotely steer the wheels of the trailer. Unloading of the grain takes place separately from both the combine hopper and from the grain cart.

The present invention is a basic improvement on the unloading of grain from both the combine hopper and from the grain cart of a combine and grain cart combination.

BRIEF SUMMARY OF THE INVENTION

An improved combination of a powered combine carrying a combine grain bin for housing harvested grain and a towed grain cart carrying a grain cart bin for housing harvested grain includes improved harvested grain transfer between the combine grain bin and the grain cart bin and improved off-loading of harvested grain from the combination. A generally horizontally disposed first grain movement assembly is pivotally connected within the combine grain bin and pivotally connected within the grain cart bin and disposed for reciprocally transporting grain between the combine grain bin and the grain cart bin. A generally vertically disposed second grain movement assembly is cooperatively operable with the first grain movement assembly for transferring grain from the grain cart bin to the first grain movement assembly and thence to the combine grain bin. An off-loading grain movement assembly is disposed for off-loading grain only from the combine grain bin.

BRIEF DESCRIPTION OF THE DRAWINGS

For a fuller understanding of the nature and advantages of the present invention, reference should be had to the following detailed description taken in connection with the accompanying drawings, in which.

The drawings will be described in detail below.

DETAILED DESCRIPTION OF THE INVENTION

The present invention improves upon the grain cart and combine combination disclosed in U.S. Pat. No. 5,904,365, which unloads harvested grain from both the onboard combine grain bin and the grain cart bin. Such a configuration runs the risk that the two unload augers might collide. Also, the combine operator must align two unload augers with the truck into which the harvested grain is unloaded into. The present design relies on only one unload mechanism (e.g., auger, bucket conveyor, cleated conveyor, or the like) which simplifies unloading and eliminates any collision hazard potential occasioned by use of multiple unload assemblies. Accordingly, a "towed" grain cart for present purposes comprehends a grain cart that simply is towed (having no ability to steer and not powered), is steerable only, is powered only, is both powered and steerable.

Figure 1:
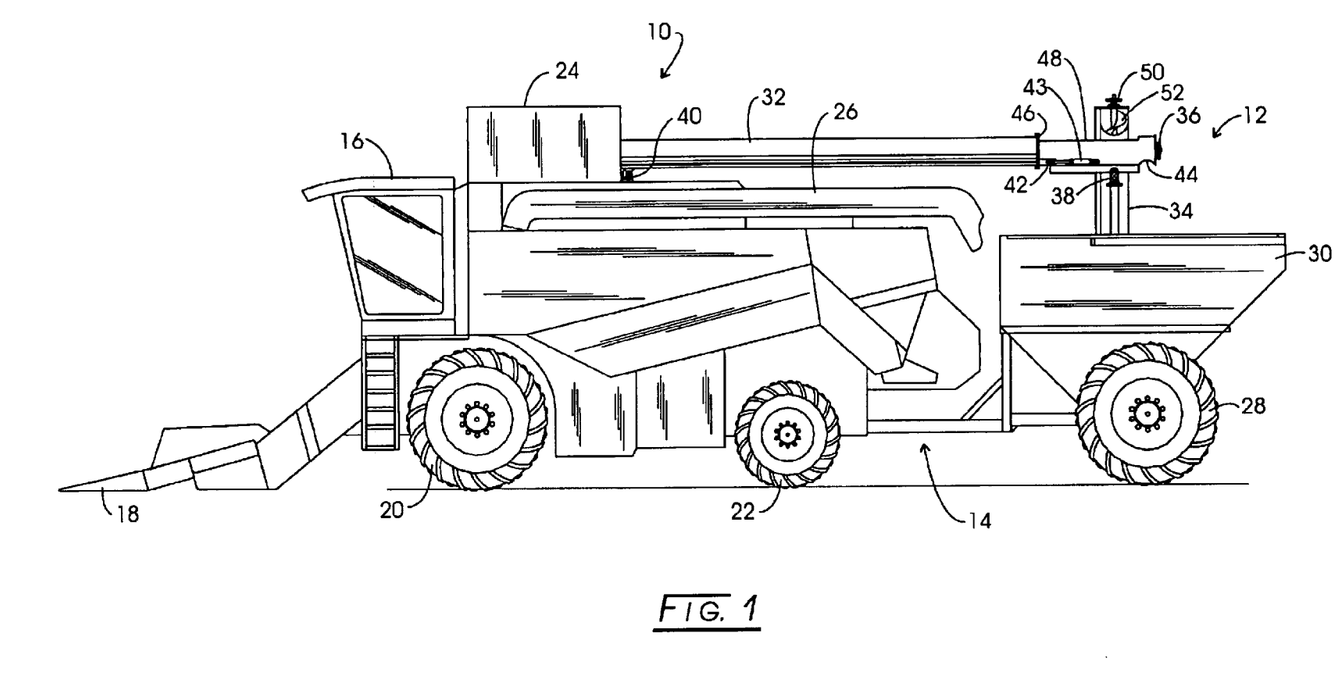
FIG. 1 is a side elevational view of the novel combination of combine (or harvester) and towed grain cart.
Figure 2:
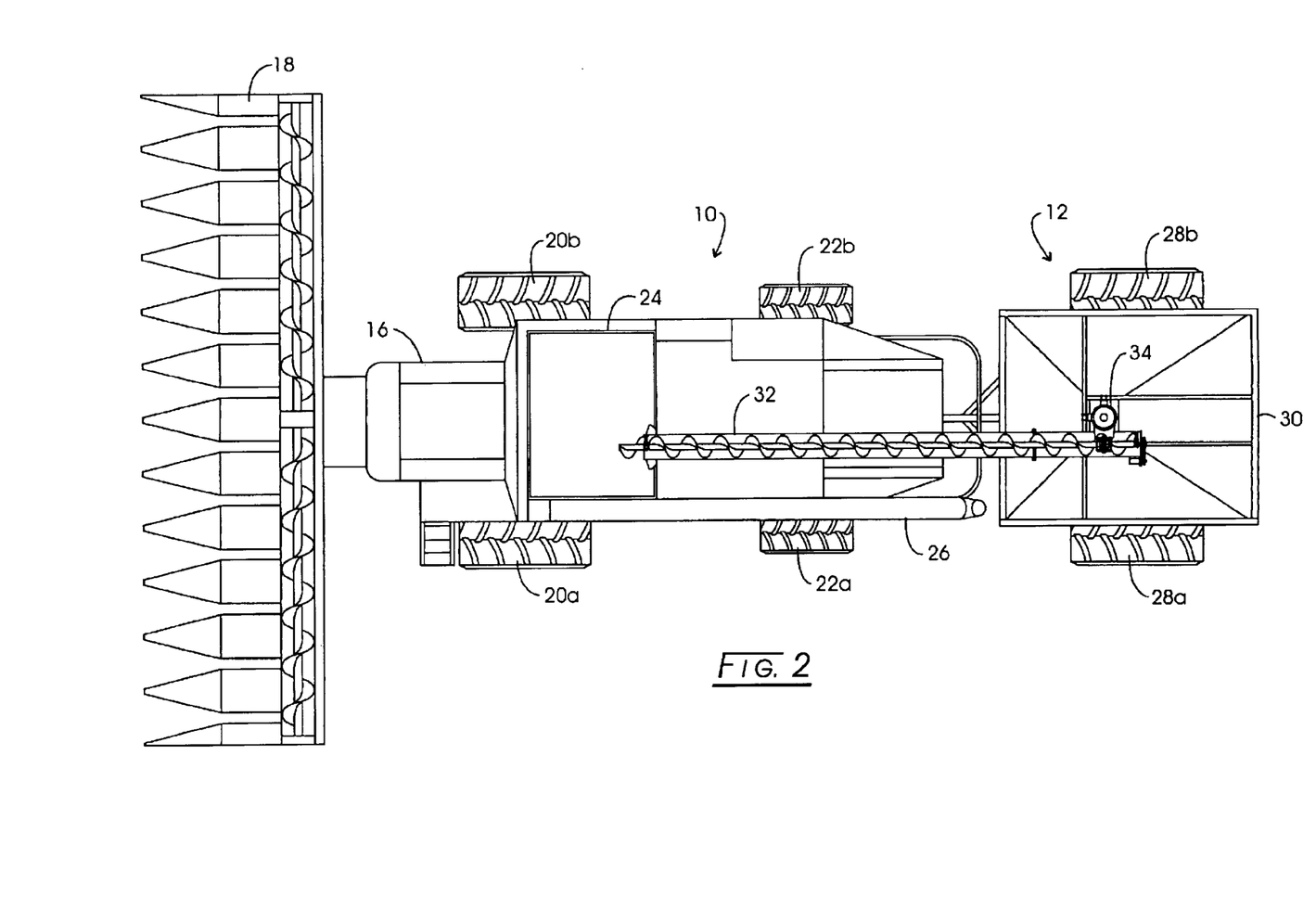
FIG. 2 is an overhead view of the novel combination illustrated in FIG. 1.
Figure 5:
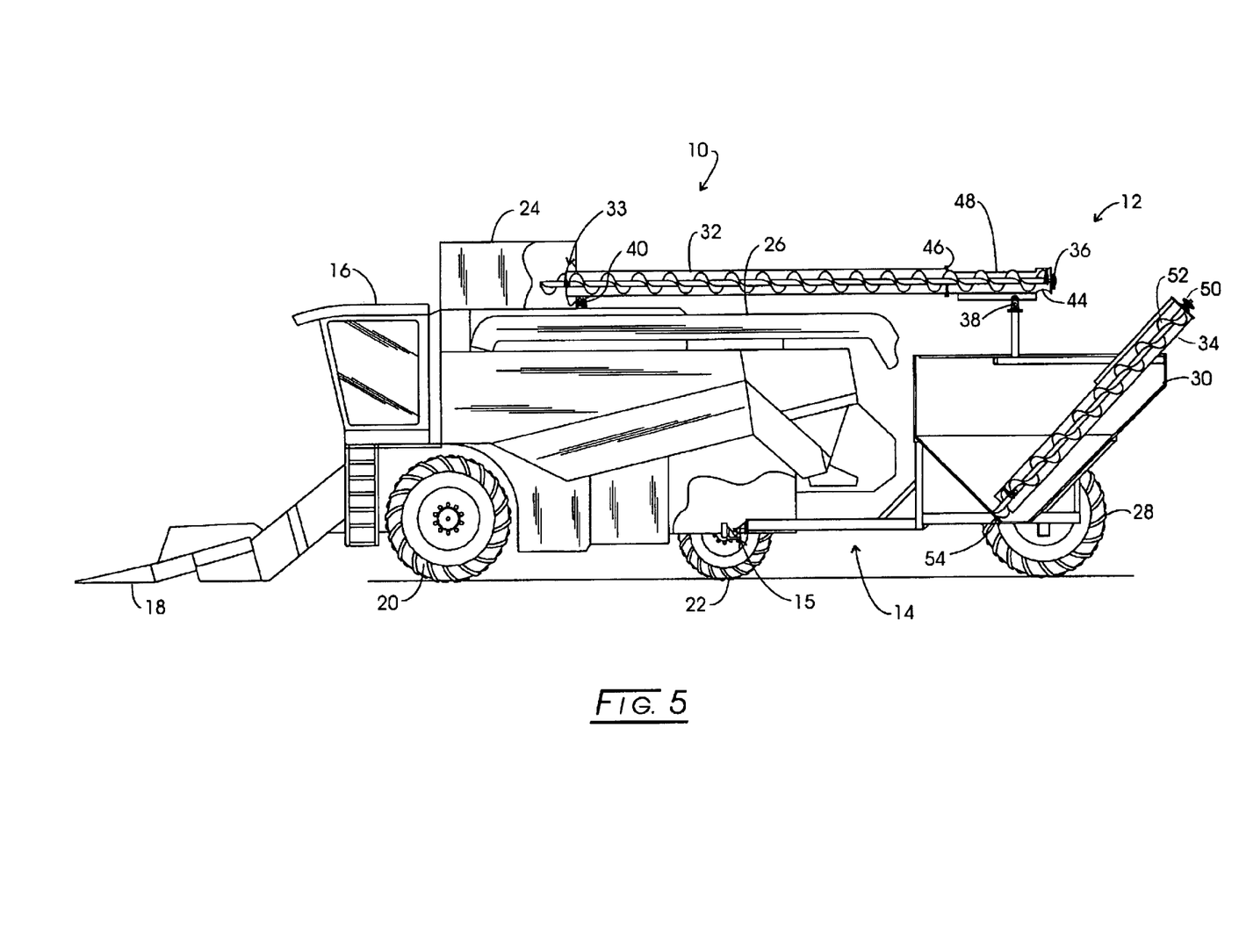
FIG. 5 is side elevational view like that in FIG. 1, but where the grain cart bin vertical auger is in a stowed position.

Referring initially to FIG. 1, a combine, 10, is seen towing a grain cart, 12, which are mechanically interconnected by a tongue assembly, 14, which includes a ball hitch assembly, 15 (FIG. 5). Combine 10 generally includes a cab, 16, in which the operator is seated, a cornhead, 18, a drive wheel pair, 20, a steering wheel pair, 22 (only one of 35 each set of wheels being depicted in FIG. 1), a primary grain hopper or combine grain bin, 24, and an auger assembly, 26, for unloading hopper 24. Such combine is a modem combine with all of the appurtenances and features that combine manufacturers provide today. Similarly, grain cart 12 is conventional in construction in that it includes a wheel pair, 28 (see FIG. 2 to view both wheel pairs 28a and 28b), a secondary grain hopper or grain cart bin, 30, and tongue 14.

Figure 3:
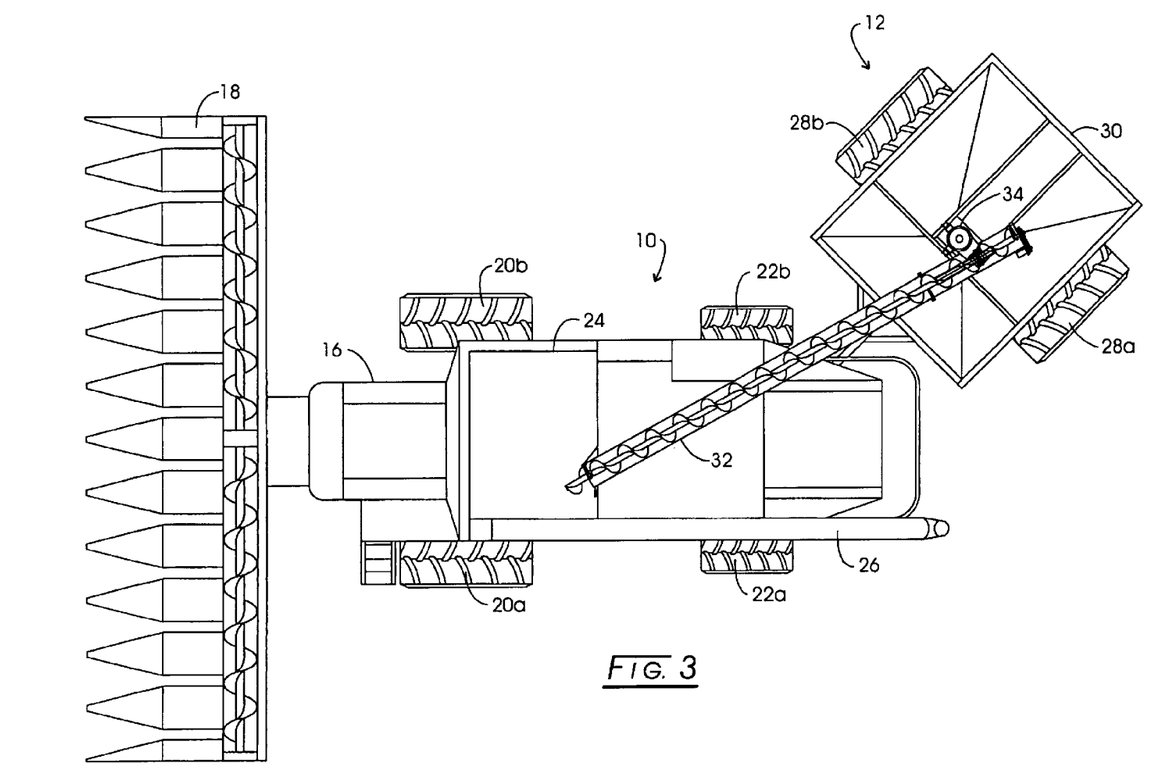
FIG. 3 is an overhead view of the novel combination when the harvester is making a right turn.

It will be observed that a generally horizontal first grain transfer assembly, 32, runs between combine grain bin 24 and grain cart bin 30. A generally vertical grain transfer assembly, 34, is seen to be located within grain cart bin 30 and is interconnected with first grain transfer assembly 32. Horizontal grain transfer assembly 32 is seen to extend into combine grain bin 24 through its rear wall (see FIG. 5) and vertically at about its midpoint. A canvas, rubber, or other suitable material seal, 33, keeps the harvested grain from spilling out, yet permits movement of assembly 32 during turning of the combine, as will be described below in connection with FIGS. 3 and 4. This location means that as soon as combine grain bin 24 is about one-half full, harvested grain housed in bin 24 can be withdrawn and transferred into grain cart bin 30. Conversely, by reversing the direction of travel of transfer assembly 32 grain can be transferred from grain cart bin 30 back into combine grain bin 24 for its unloading via unloading mechanism 26.

While the grain transfer assemblies can be conveyors, augers, or similar known devices (e.g., auger, bucket conveyor, cleated conveyor, or the like), the present invention will be specifically illustrated with (and not limited to) augers. Generally, a hydraulic motor assembly, 36, powers horizontal harvested grain transfer assembly (auger) 32 and is composed of a suitably sized hydraulic motor, chain, sprocket, and bearings. Auger assembly 32 is supported at its grain cart end by a joint, 38, and at its combine end by a joint, 40. These joints will be described in detail below. Auger assembly 32 also is provided with a grain cart discharge door, 42, which is hydraulic cylinder actuated by a hydraulic cylinder, 43, and with a rear discharge, 44, and with a shroud rotate joint, 46. Auger assembly 32 is shrouded or covered from joint 46 forward to combine grain bin 24 and is an open trough, 48, from joint 46 rearwardly. Harvested grain can be discharged from auger assembly 32 into grain cart bin 30 via discharges 42 and 44. Discharge of harvested grain into grain cart bin 30 is facilitated by this dual discharge scheme. Such scheme also means that discharge 44 is disposed rearwardly of vertical auger assembly 34.

A hydraulic motor assembly, 50, powers vertical auger assembly 34 and generally is composed of a suitably sized hydraulic motor, chain, sprocket, and bearings. Harvested grain housed in grain cart 30 is withdrawn from grain cart bin 30 by auger assembly 34 and discharged from a spout, 52, into open trough 48. Hydraulic motor 36 is reversible so that harvested grain can be reciprocally transported between combine grain bin 24 and grain cart bin 30, including the transfer of harvested grain from grain cart bin 30 back to combine grain bin 24. Vertical auger assembly 34 is mounted to grain cart bin 30 with a trunnion mount, 54 (to be further described in connection with FIG. 12). Trunnion mount 54 permits auger assembly 34 to be rotated rearwardly to rest on a side of grain cart bin 30 for storage.

Figure 4:
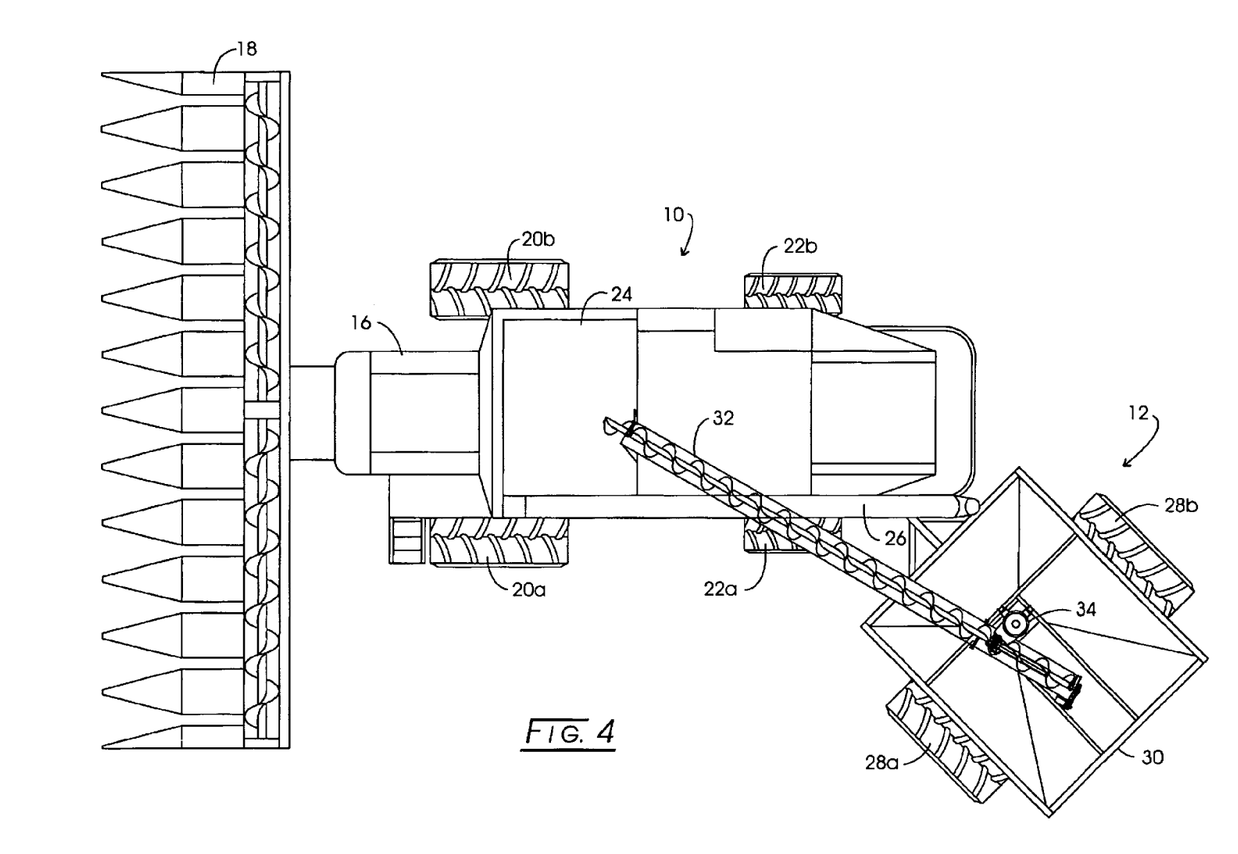
FIG. 4 is an overhead view of the novel combination when the harvester is making a left turn.

Attachment of auger assembly 32 at either end requires pivoting capability in order for the combine and towed cart to turn. This can be seen by reference to FIGS. 3 (right turn) and 4 (left turn). It will be apparent that if grain transfer assembly 32 cannot pivot that turning of combine 10 cannot be accomplished. The flexibility of seal 17 also enables auger assembly 32 to pivot as it extends through the hole in the side of combine grain bin 24. Such pivoting also requires the hole in grain transfer assembly 32 to be large enough to accommodate turning of combine 10 with consequent pivoting of auger assembly 32.

Figure 6:
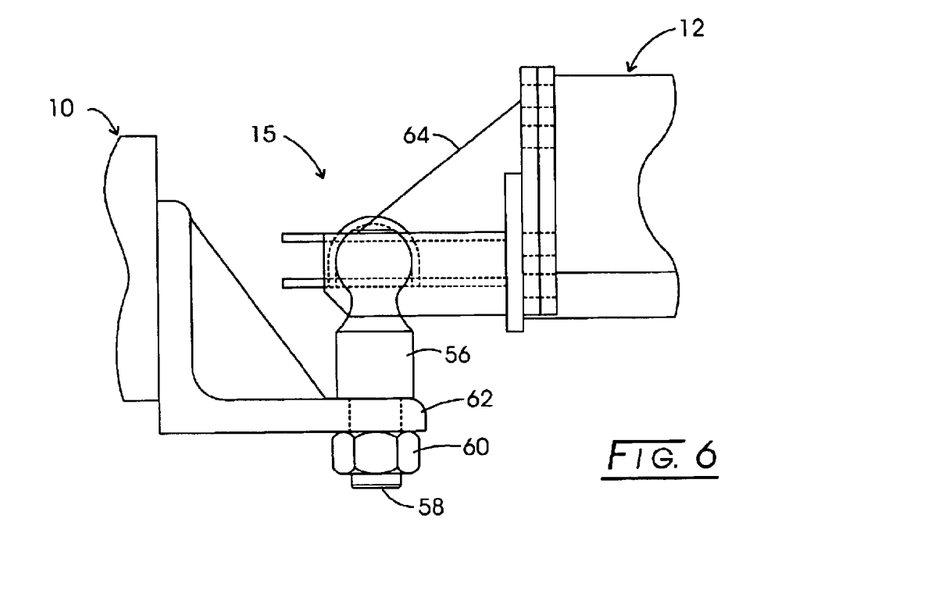
FIG. 6 is a side elevational view of the joint (ball hitch) that connects with combine with the towed grain cart.

Ball hitch assembly 15, illustrated in FIG. 6, enables combine 10 to tow grain cart 12. While a variety of hitches can be envisioned, ball hitch assembly 15 includes a tow ball, 56, with a threaded end, 58, retained by a nut, 60, to a bracket assembly, 62, attached to the rear of combine 10. Correspondingly, grain cart 12 at its forward end carries a bracket assembly, 64, having a cavity that mates over tow ball 56 with a suitable locking mechanism to guard against the premature or unwanted separation of the hitch assembly 15.

Figure 7:
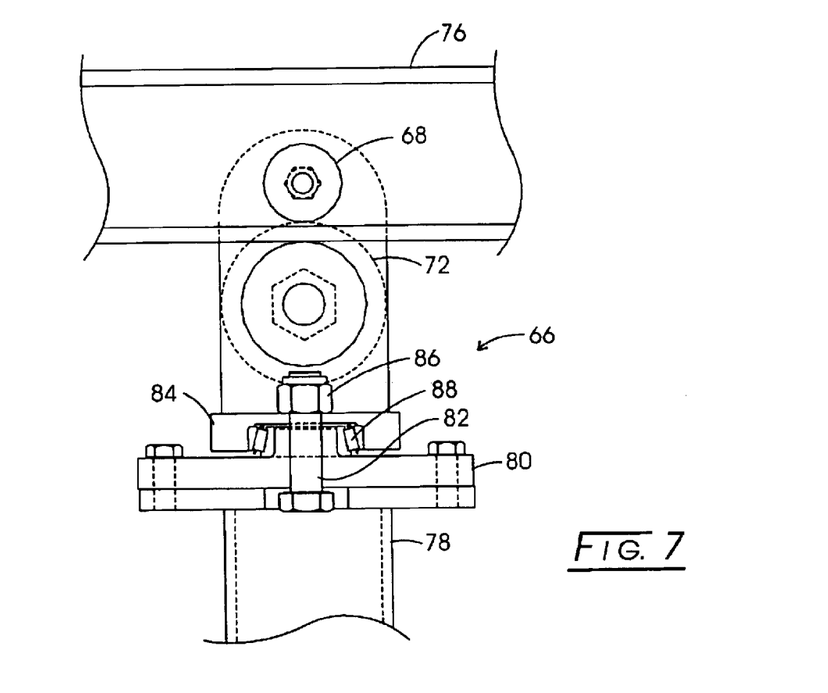
FIG. 7 is a side elevational view of the horizontal auger joint located in the grain cart.
Figure 8:
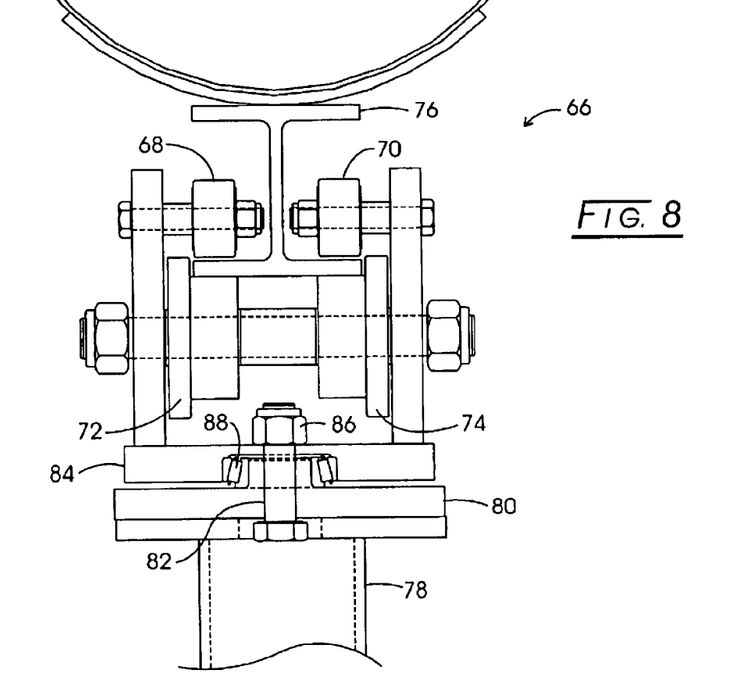
FIG. 8 is an end elevational view of the horizontal auger joint illustrated in FIG. 7.
Figure 9:
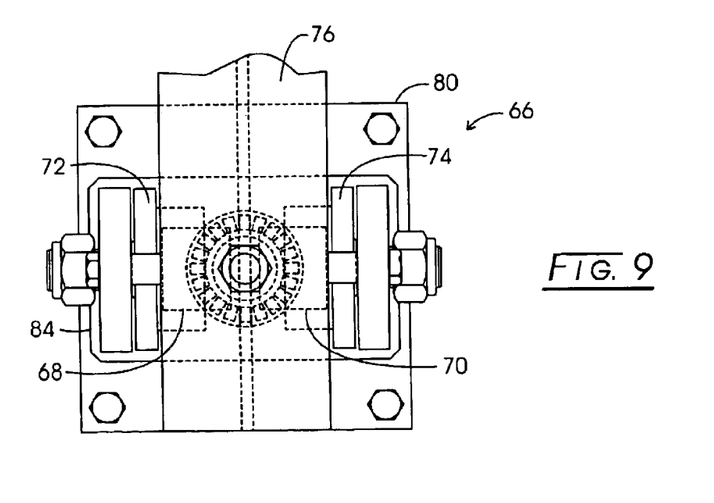
FIG. 9 is an overhead top plan view of the horizontal auger joint illustrated in FIG. 7.

FIGS. 7–9 depict a joint assembly, 66, that retains auger assembly 32 in grain cart bin 12. Joint assembly 66 can be seen to include a pair of upper flat rollers, 68 and 70; and a pair of lower flanged rollers, 72 and 74, which roller pairs ride on the bottom flange of an I-beam, 76, which is carried by auger assembly 32. These pairs of rollers permit auger assembly 32 via I-beam 76 to move relative to a post, 78, which carries joint assembly 66 and which is fixed at its lower end to grain cart bin 30. Post 78 carriers a flange assembly, 80, at its upper end, which retains a bolt, 82, that bolts onto a lower apertured plate, 84, with a nut, 86, to flange assembly 66. Rotation bearing assembly, 88 (e.g., tapered roller bearings), permit rotation of flange assembly 66 about bolt 82 and post 78. Rail 76 and, hence, auger assembly 32, now can be displaced longitudinally and rotationally about post 78, as required when combine 10 turns right (FIG. 3) or turns left (FIG. 4). Such combined movement is equivalent to the grain cart end of auger assembly 32 being pivotally attached at grain cart bin 12. Joint assembly 66 also is designed to be disposed at any location along auger assembly 32, not only at its end. Such design permits auger assembly 32 to extend beyond the location of post 78.

Figure 10:
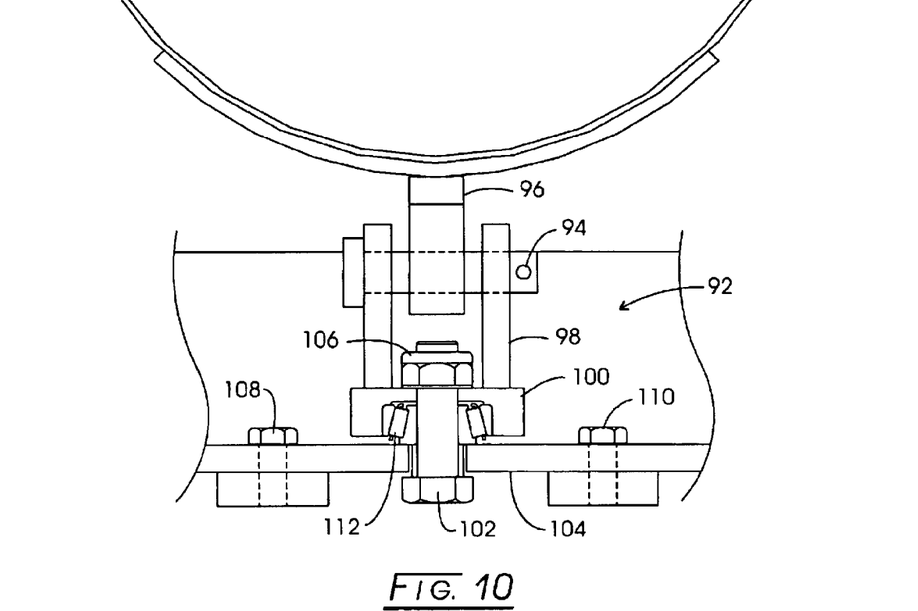
FIG. 10 is an overhead view of the horizontal auger joint located in the combine.
Figure 11:
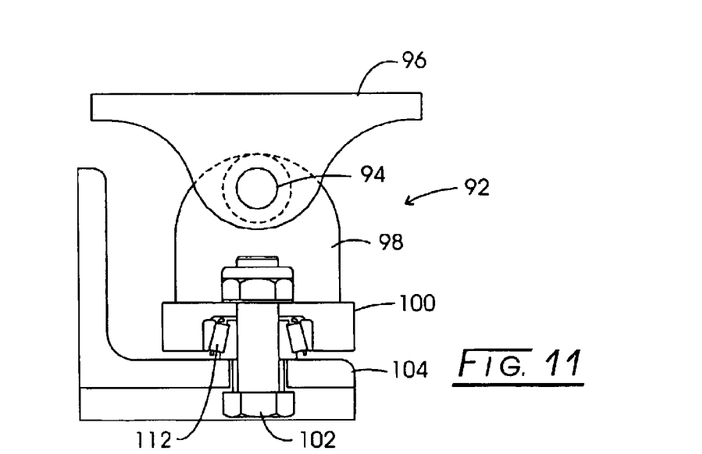
FIG. 11 is a side elevational view of the horizontal auger joint illustrated in FIG. 10.

FIGS. 10–11 depict a joint assembly, 92, that retains auger assembly 32 in combine bin 24. Joint assembly 92 can be seen to include a pin, 94, that runs through an apertured plate, 96, attached to combine bin 24 and through a pair of spaced-apart apertured fingers of a yoke assembly, 98. Yoke assembly 98 in turn has an end apertured plate, 100, through which another threaded bolt, 102, runs and is held in place by a nut, 106. Bolt 102 also runs through an aperture in a plate, 104, which is bolted onto an end of auger assembly 32 with a pair bolts, 108 and 110. Disposed in association with plate 100 are rotational bearing assembly, 112, e.g., tapered roller bearings. Pin 94 permits auger assembly 32 to move vertically with respect to combine 10, while rotational bearings 112 and 114 permit auger assembly 32 to twist with respect to combine 10.

Joint assembly 66 in combination with joint assembly 92 permits auger assembly 32 to twist, move vertically, and to move laterally. Such movement is necessary not only for turning of combine 32, but also for combine 10 and towed grain cart 12 to traverse over uneven ground.

Figure 12:
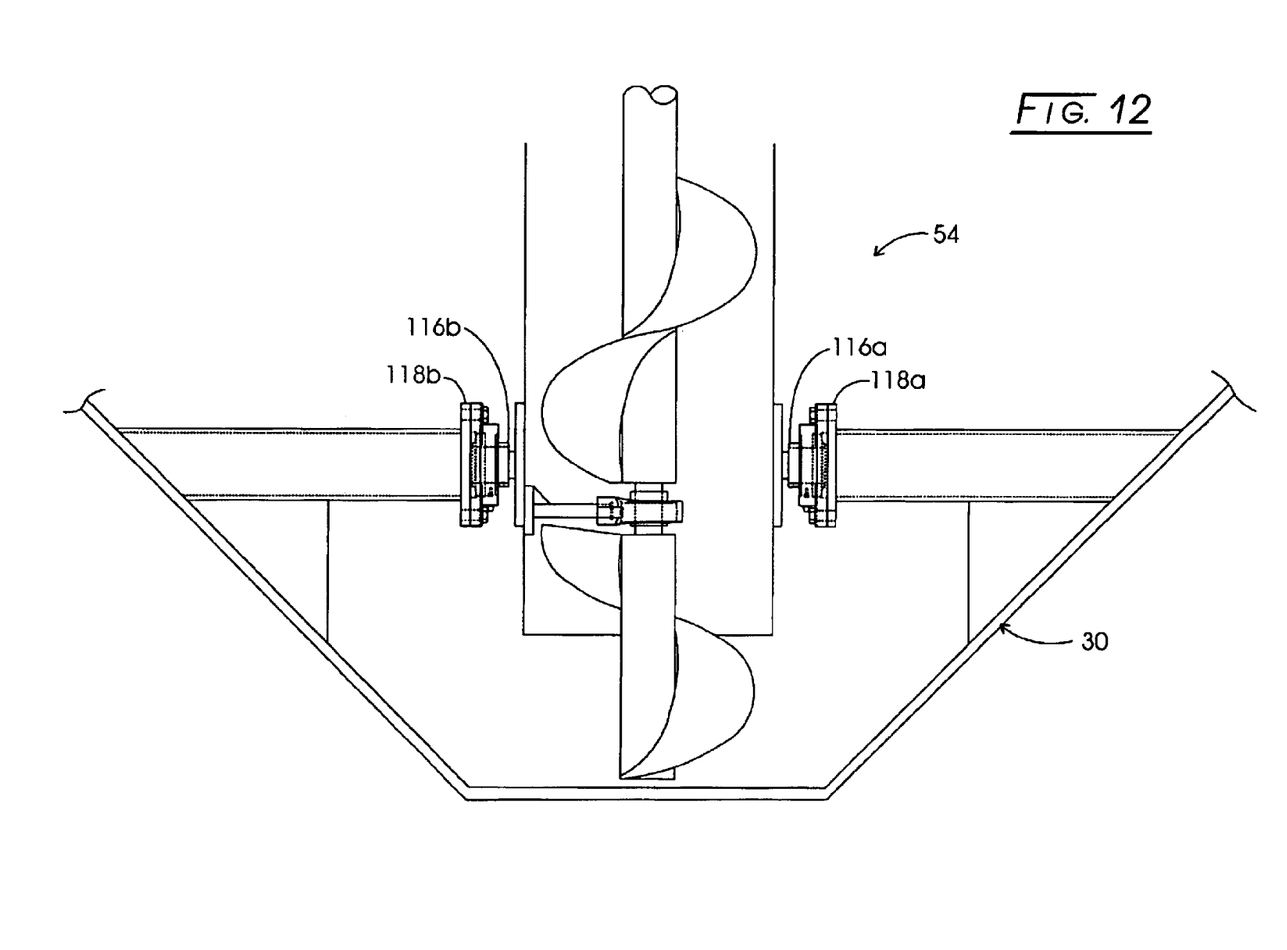
FIG. 12 a side elevational view of the trunnion mount for the vertical auger located within the grain cart bin.

FIG. 12 illustrates trunnion assembly 54, which holds vertical auger assembly 34 in its vertical orientation and then to its storage orientation (FIG. 5). It will be observed that a pin, 116, is affixed (e.g., welded) to vertical auger assembly 34. A bearing, 118, is affixed (e.g., bolted) to grain cart bin 30 or to a structural component of grain cart 12. The "a" and "b" designations are for each of the corresponding parts located on opposite sides of auger assembly 34. Trunnion assembly (or assemblies) 54 holds auger assembly 34 in a vertical orientation during harvesting operations and then permit auger assembly 34 to be folded downwardly for storage.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. An improved combination of a powered combine and a grain cart towed with said combine, said combine carrying an on-board combine grain bin for housing harvested grain and said grain cart carrying a grain cart bin for housing harvested grain, the improvement for transferring harvested grain between said combine grain bin and said grain cart bin and for off-loading harvested grain from said combination, which comprises:
   (a) a generally horizontally disposed first grain movement assembly pivotally connected within said combine grain bin and pivotally connected within said grain cart bin and disposed for reciprocally transporting grain between said combine grain bin and said grain cart bin;
   (b) a generally vertically disposed second grain movement assembly cooperatively operable with said first grain movement assembly for transferring grain from said grain cart bin to said first grain movement assembly and thence to said combine grain bin; and
   (c) an off-loading grain movement assembly disposed for off-loading grain only from said combine grain bin.

2. The combination of claim 1, wherein all of said grain movement assemblies comprise auger assemblies.

3. The combination of claim 1, wherein said second grain movement assembly is attached to said grain cart by a trunnion assembly.

4. The combination of claim 3, wherein said trunnion assembly permits said second grain movement assembly to be moved to a non-vertical storage position.

5. The combination of claim 1, wherein said combine grain bin has a rear wall having an aperture, wherein said first grain movement assembly has an end which penetrates into said combine grain bin through said rear wall aperture.

6. The combination of claim 5, wherein said rear wall aperture is covered with a flexible seal through which said first grain movement assembly end penetrates.

7. The combination of claim 1, wherein said first grain movement assembly is uncovered adjacent to said second grain movement assembly, wherein said second grain movement assembly is oriented for transferring grain from said grain cart into said first grain movement assembly where it is uncovered.

8. The combination of claim 1, wherein said first grain movement assembly has spouts through which grain is transferred into said grain cart.

9. The combination of claim 1, wherein said first grain movement assembly is pivotally connected to said combine grain bin with a joint assembly which comprises a combination of a pivot pin and a rotation bearing.

10. The combination of claim 1, wherein said first grain movement assembly carries a lower I-beam and is pivotally connected to said grain cart bin with a joint assembly which comprises two pairs of rollers that ride about a flange of said I-beam and a rotation bearing.

11. The combination of claim 1, wherein said towed grain cart is one or more non-powered and non-steerable, steerable, powered, or powered and steerable.

12. A method for transferring harvested grain between a combine grain bin and a grain cart bin and for off-loading harvested grain from a combination of a powered combine and a grain cart towed with said combine, said combine carrying said on-board combine grain bin for housing harvested grain and said grain cart carrying said grain cart bin for housing harvested grain, which comprises:
   (a) providing a generally horizontally disposed first grain movement assembly pivotally connected within said combine grain bin and pivotally connected within said grain cart bin and disposed for reciprocally transporting grain between said combine grain bin and said grain cart bin;
   (b) providing a generally vertically disposed second grain movement assembly cooperatively operable with said first grain movement assembly for transferring grain from said grain cart bin to said first grain movement assembly and thence to said combine grain bin;
   (c) providing an off-loading grain movement assembly disposed for off-loading grain only from said combine grain bin;
   (d) transferring harvested grain from said combine grain bin into said grain cart bin with said first grain movement assembly;
   (e) when desired, transferring harvested grain in said grain cart bin with said second grain movement assembly into said first grain movement assembly and then from said first grain movement assembly into said combine grain bin; and
   (f) off-loading harvested grain only from said combine grain bin with said off-loading movement assembly.

13. The method of claim 12, wherein all of said grain movement assemblies provided comprise auger assemblies.

14. The method of claim 12, wherein said second grain movement assembly is attached to said grain cart by a trunnion assembly.

15. The method of claim 14, wherein said trunnion assembly permits said second grain movement assembly to be moved to a non-vertical storage position.

16. The method of claim 12, wherein said combine grain bin is provided with a rear wall having an aperture, wherein said first grain movement assembly is provided with an end which penetrates into said combine grain bin through said rear wall aperture.

17. The method of claim 16, wherein said rear wall aperture is covered with a flexible seal through which said first grain movement assembly end penetrates.

18. The method of claim 12, wherein said first grain movement assembly is uncovered adjacent to said second grain movement assembly, wherein said second grain movement assembly is oriented for transferring grain from said grain cart into said first grain movement assembly where it is uncovered.

19. The method of claim 12, wherein said first grain movement assembly is provided with spouts through which grain is transferred into said grain cart.

20. The method of claim 12, wherein said first grain movement assembly is pivotally connected to said combine grain bin with a joint assembly which comprises a combination of a pivot pin and a rotation bearing.

21. The method of claim 12, wherein said first grain movement assembly carries a lower I-bean and is pivotally connected to said grain cart bin with a joint assembly which comprises two pairs of rollers that ride about a flange of said I-beam and a rotation bearing.

22. The method of claim 12, wherein said towed grain cart is one or more non-powered and non-steerable, steerable, powered, or powered and steerable.

* * * * *